US011648928B2

(12) United States Patent
Whitt (10) Patent No.: US 11,648,928 B2
(45) Date of Patent: May 16, 2023

(54) DIAGNOSTICS AND MAINTENANCE TOOL TO MEASURE DISTANCE TRAVELED AND PRESSURE APPLIED TO A COMPONENT

(71) Applicant: Robert E. Whitt, Cincinnati, OH (US)

(72) Inventor: Robert E. Whitt, Cincinnati, OH (US)

( * ) Notice: Subject to any disclaimer, the term of this patent is extended or adjusted under 35 U.S.C. 154(b) by 0 days.

(21) Appl. No.: 17/804,150

(22) Filed: May 26, 2022

(65) Prior Publication Data

US 2023/0109461 A1 Apr. 6, 2023

(51) Int. Cl.
*B60T 17/22* (2006.01)
*G01M 17/00* (2006.01)
*B60K 26/02* (2006.01)

(52) U.S. Cl.
CPC ............ *B60T 17/223* (2013.01); *G01M 17/00* (2013.01); *B60K 26/02* (2013.01)

(58) Field of Classification Search
CPC .... B60T 17/223; B60T 17/221; Y10S 254/05; G01L 5/28; G05G 1/38; G01M 17/00; B60K 26/02
See application file for complete search history.

(56) References Cited

U.S. PATENT DOCUMENTS

| | | | | |
|---|---|---|---|---|
| 10,857,990 | B2* | 12/2020 | Whitt | B60T 17/222 |
| 2007/0114836 | A1* | 5/2007 | Kaminski | B60T 13/746 |
| | | | | 303/7 |
| 2013/0205882 | A1* | 8/2013 | Neu | G05G 1/38 |
| | | | | 73/132 |

OTHER PUBLICATIONS

MTS Technical Paper, Magnetostrictive Linear-Position Sensors, Wayback Machine downlodaded 2016 https://web.archive.org/web/20160418040918/https://www.controldesign.com/assets/wp_downloads/pdf/mts_sensors.pdf (Year: 2016).*

* cited by examiner

*Primary Examiner* — Eric S. McCall
*Assistant Examiner* — Timothy P Graves
(74) *Attorney, Agent, or Firm* — Barry Choobin; Patent 360

(57) ABSTRACT

A diagnostics and maintenance tool can be used for performing diagnostics and maintenance of automotive, farming, construction, trucking, recreational and aviation vehicles & equipment. The diagnostics and maintenance tool can be used to measure distance traveled and pressure applied to brake, clutch and acceleration pedals, for example. The tool can reduce labor costs by reducing the time it takes perform certain diagnostic and maintenance activities. The tool can increase customer satisfaction by increasing accuracy and providing quantifiable data versus just going off of "human hunches." The tool can reduce misdiagnoses by a technician who does not have to rely on "guesswork" or "process of elimination" for certain tasks. The tool may attach between a support and a component where distance traveled and applied pressure is to be measured. The tool may be pre-programmed to apply a known pressure or distance or may be remotely operated.

6 Claims, 4 Drawing Sheets

DIAGNOSTICS AND MAINTENANCE TOOL TO MEASURE DISTANCE TRAVELED AND PRESSURE APPLIED TO A COMPONENT

BACKGROUND OF THE INVENTION

1. Field of the Invention

Embodiments of the invention relate generally to diagnostic and maintenance tools. More particularly, embodiments of the invention relate to diagnostics and maintenance tools that can measure, for example, distance traveled and pressure applied to brake, clutch and acceleration pedals within automotive, farming, construction, trucking, recreational and aviation vehicles and equipment.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Performing certain diagnostic and maintenance tasks that require or can benefit from pressure being applied to brake, clutch and acceleration pedals within automotive, farming, construction, trucking, recreational and aviation vehicles and equipment has historically been a two person task and requires a human being to physically apply pressure to make recommendations based on the "feel". There is currently no way to perform these tasks without human labor involved or the ability to produce quantifiable data that allows more accurate testing and recommendations.

For over 100 years, anytime pressure needs to be applied to a pedal for maintenance or diagnostics, it has always been done by human being using their foot or occasionally by their hand. There are currently no existing methods, whether human powered or tool powered, that can accurately measure distance traveled or pressure applied to pedals of clutch, brake or acceleration systems. Every year accidents and braking issues are caused by brake systems not being totally "closed", meaning there are hidden leaks. This can happen even after brake system maintenance, replacement or repair has been performed by professionals. There is currently no tool/process to accurately detect microscopic leaks that are not detectable by a technician doing a manual check with his foot engaging/applying pressure to the pedal.

When bleeding brake systems, the pedal should get "firmer" as each brake line is bled. This is a critical process in maintaining proper braking power. There is currently no technology that allows someone to measure accurately if the pedal is getting "firmer" after each brake line is bled. Such a determination is currently done by a technician going by "how it feels" with their foot. While this method works most of the time, it isn't 100% accurate and other issues may be missed.

In view of the foregoing, there is a need for an improved system and method for performing maintenance and diagnostics on various equipment where pressure and distance measurements may be useful.

SUMMARY OF THE INVENTION

Embodiments of the present invention provide a diagnostic and maintenance tool comprising a ram rod housing; a ram rod at least partially extendable from a first end of the ram rod housing; a ram rod extension actuator operable to move the ram rod out of the first end of the ram rod housing; an extension length measurement device operable to determine a distance of extension of the ram rod out of the first end of the ram rod housing; a first coupling member disposed on a distal end, relative to the ram rod housing, of the ram rod, the distal end defining a first end of the diagnostic and maintenance tool; a second coupling member disposed on a second end of the diagnostic and maintenance tool, opposite the first end; and a controller operable to control the ram rod extension actuator, wherein the controller receives data from the extension length measurement device; and the controller displays data related to the distance of extension of the ram rod.

Embodiments of the present invention further provide a diagnostic and maintenance tool comprising a cylinder; a ram rod at least partially extendable from a first end of the cylinder; a ram rod linear actuator operable to extend the ram rod from the first end of the cylinder; an extension length measurement device operable to determine a distance of extension of the ram rod out of the first end of the cylinder; a first coupling member disposed on a distal end, relative to the cylinder, of the ram rod, the distal end defining a first end of the diagnostic and maintenance tool; a second coupling member disposed on a second end of the diagnostic and maintenance tool, opposite the first end; and a controller operable to control the ram rod extension actuator, wherein the controller receives data from the extension length measurement device; and the controller controls the ram rod linear actuator to apply a predetermined force to the ram rod.

Embodiments of the present invention also provide a diagnostic and maintenance tool comprising a pneumatic cylinder; a ram rod at least partially extendable from a first end of the pneumatic cylinder; an air valve connectable to a pressurized air source to supplying pressurized air to the pneumatic cylinder, wherein the pressurized air extends the ram rod from the first end of the pneumatic cylinder; a linear transducer and a magnetic position sensor operable to determine a distance of extension of the ram rod out of the first end of the pneumatic cylinder; a pressure measurement device to detect a pressure applied by the ram rod during extension thereof by measurement of air pressure within the pneumatic cylinder; a first coupling member disposed on a distal end, relative to the pneumatic cylinder, of the ram rod, the distal end defining a first end of the diagnostic and maintenance tool; a second coupling member disposed on a second end of the diagnostic and maintenance tool, opposite the first end; and a controller operable to control the ram rod extension actuator, wherein the controller receives data from the extension length measurement device; the controller controls the air valve to pressurize the pneumatic cylinder; and the controller displays at least one of data related to the distance of extension of the ram rod or data related to the pressure measured by the pressure measurement device.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide diagnostic and maintenance tools for performing diagnostics and maintenance of automotive, farming, construction, trucking, recreational and aviation vehicles & equipment. The diagnostics and maintenance tool can be used to measure distance traveled and pressure applied to brake, clutch and acceleration pedals, for example. The tool can reduce labor costs by reducing the time it takes perform certain diagnostic and maintenance activities. The tool can increase customer satisfaction by increasing accuracy and providing quantifiable data versus just going off of "human hunches." The tool can reduce misdiagnoses by a technician who does not have to rely on "guesswork" or "process of elimination" for certain tasks. The tool may attach between a support and a component where distance traveled and applied pressure is to be measured. The tool may be pre-programmed to apply a known pressure or distance or may be remotely operated.

The diagnostics and maintenance tool may be used in other environments in addition to automotive, farming, construction, trucking and aviation vehicles and equipment. The tool as described herein may be used to provide any remote actuation of any device, permitting one person to actuate a device while not having to be physically present at the device to make the actuation. For example, the tool may be used to actuate a plumbing valve while the user is watching for a flow downstream of the valve.

The diagnostics and maintenance tool can include coupling member on a first end thereof that can connect one end of the tool to a stationary object, such as a vehicle's steering wheel grip. A ram rod can extend from and retract into a ram rod housing, movable outward via a pneumatic air cylinder or via an electrically actuated motor, for example, and movable inward via a retraction spring, pressurized air, reversal of the electric motor or simply via the release of the force provided by the pneumatic air cylinder. The tool can include, opposite the coupling member, a component engaging member, such as a brake pedal engaging member to attach the tool to a brake pedal, for example. The tool may be similar to that described in U.S. Pat. No. 10,857,990, herein incorporated by reference, further modified as described in greater detail below.

The ram rod may be contained at least partially within a pneumatic air cylinder and may extend the entire length of the pneumatic air cylinder. In other words, the ram rod may be substantially parallel within the interior of the pneumatic air cylinder. A recoil spring may be contained within pneumatic air cylinder and may extend the entire length of the pneumatic air cylinder. The recoil spring may be unloaded (i.e., not compressed) and may be disposed between a top of the pneumatic air cylinder and a spring stop. The spring stop may be disposed substantially perpendicular on the end of the ram rod within pneumatic air cylinder. The recoil spring may surround the ram rod within the interior of the pneumatic air cylinder in a substantially coiled orientation. As such, the ram rod may reciprocate up and down with respect to a lengthwise direction within the pneumatic air cylinder.

The pneumatic air cylinder may be between 1 and 10 inches in diameter and between 4 and 50 inches in length but is not limited thereto.

The diagnostics and maintenance tool may communicate wirelessly with a mobile device, such that instructions may be sent between the diagnostics and maintenance tool and the mobile device. The mobile device may be a device having wireless communication capabilities, including, but not limited to, a cellular telephone, a laptop computer, a desktop computer, a tablet computer, a PDA, a smart watch, or the like. Also, the mobile device may have executed thereupon a program and/or application to facilitate communication between the mobile device and the diagnostics and maintenance tool, and/or to control electronic portions of the diagnostics and maintenance tool via the mobile device, as described in greater detail below.

The mobile device may include an input unit and a display unit but is not limited thereto. The display unit may display an image of the diagnostics and maintenance tool, and the user may use the input unit to turn on/off the diagnostics and maintenance tool as displayed on the display unit, and/or selectively manipulate the diagnostics and maintenance tool as displayed on the display unit based on a preference of the user. The mobile device may further display the current pressure applied by the diagnostics and maintenance tool, as well as the current displacement distance of the ram rod, such as the distance the ram rod is extended from the pneumatic air cylinder.

A control panel may be disposed on the diagnostics and maintenance tool and may include a switch, a battery, and a receiver, but is not limited thereto. The control panel may be powered with the battery. The battery may be lithium-ion, nickel cadmium, nickel metal hydride, alkaline, or the like, but is not limited thereto. The receiver may provide wireless communication capabilities with the mobile device.

The diagnostics and maintenance tool can be turned on to load (compress) the recoil spring. The loading of the recoil spring may provide a force against the component grip, which may pressurize a vehicle hydraulic system by applying pressure to, for example, the brake pedal with the component grip, while the coupling member (also referred to as the steering wheel grip) may keep contact with the steering wheel of a vehicle (not illustrated).

An air control system may include an air chuck quick disconnect, an air pressure gauge, an air regulator, and an air solenoid, but is not limited thereto. The air control system may be disposed along a tube connected to the pneumatic air cylinder. After the switch is activated or mobile device is used to manipulate the control panel, air solenoid may direct air through pneumatic air cylinder. The air filling the pneumatic air cylinder may extend the ram rod and apply the pressure on the component grip, which applies pressure to, for example, the brake pedal of the vehicle (not illustrated). The air regulator may control airflow while air pressure gauge may provide a display of the current air pressure within the pneumatic air cylinder. The air chuck quick disconnect may provide a seal for air and may prevent the leakage of air but may also allow for a quick release of air by removing the air chuck quick disconnect.

Referring now to FIGS. 1 through 4, a diagnostics and maintenance tool 10 (also simply referred as tool 10) can include a coupling member 12 attached to a first end of a ram rod 14. The coupling member 12 can include a shape that permits attachment to a fixed object. For example, the coupling member 12 can be C-shaped to permit attachment to a steering wheel 72 (see FIG. 1).

The ram rod 14 can be disposed in a ram rod housing, such as a pneumatic cylinder 16, as described above. In some embodiments, the pneumatic cylinder 16 may be replaced with an electronic linear motor that may drive the ram rod 14 to extend from the cylinder 16. In such an embodiment, an additional power supply may be required to the device. In some embodiments, the ram rod housing may not necessarily be cylindrical, but may be any shape that permits the ram rod 14 to extend therefrom and retract there into. Regardless of operation, the ram rod 14 may extend from the cylinder 16 and may retract back therein. As discussed above, extension of the ram rod 14 from the cylinder 16 may be caused by air pressure and retraction of the ram rod 14 back into the cylinder 16 may be caused by a recoil spring (not shown) that may be resiliently depressed when the ram rod 14 is extended from the cylinder. In some embodiments, the ram rod 14 may be retracted by a force applied thereto to push the ram rod 14 back into the cylinder 16, where a recoil spring may not be required.

Figure 1:
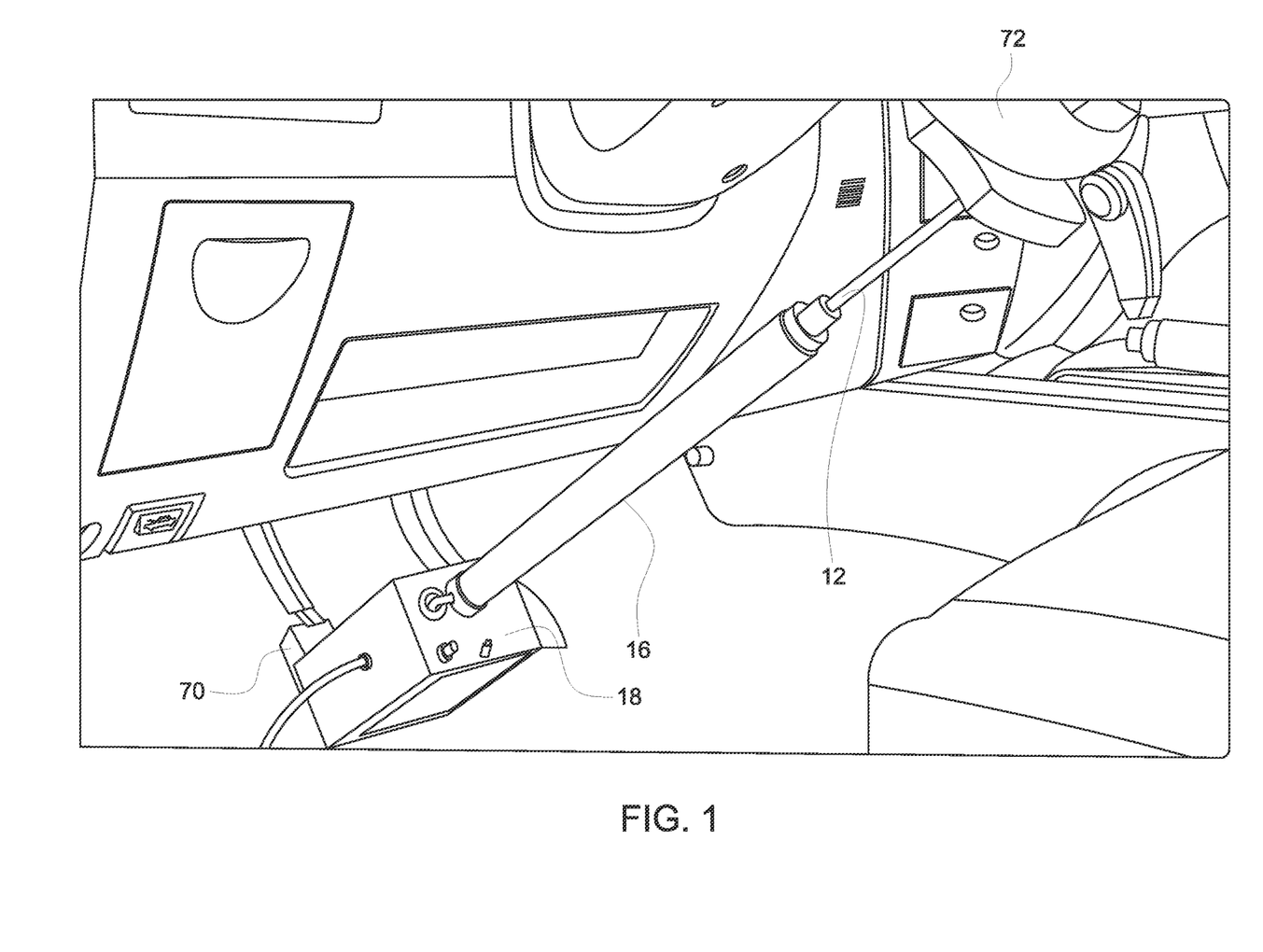
FIG. 1 illustrates diagnostic and maintenance tool installed in a vehicle for performing diagnostics and maintenance of a braking system, according to an exemplary embodiment of the present invention.
Figure 2:
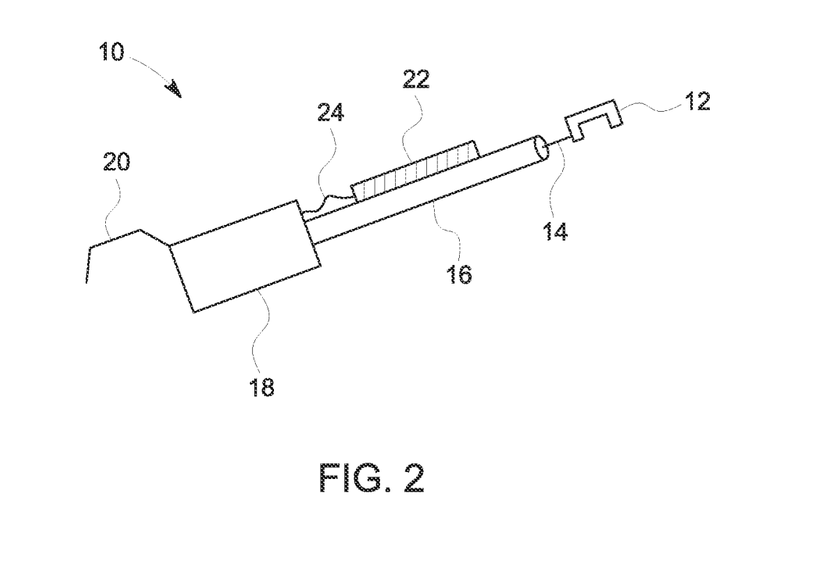
FIG. 2 illustrates a schematic side view of a diagnostic and maintenance tool having an external linear transducer, according to an exemplary embodiment of the present invention.
Figure 3:
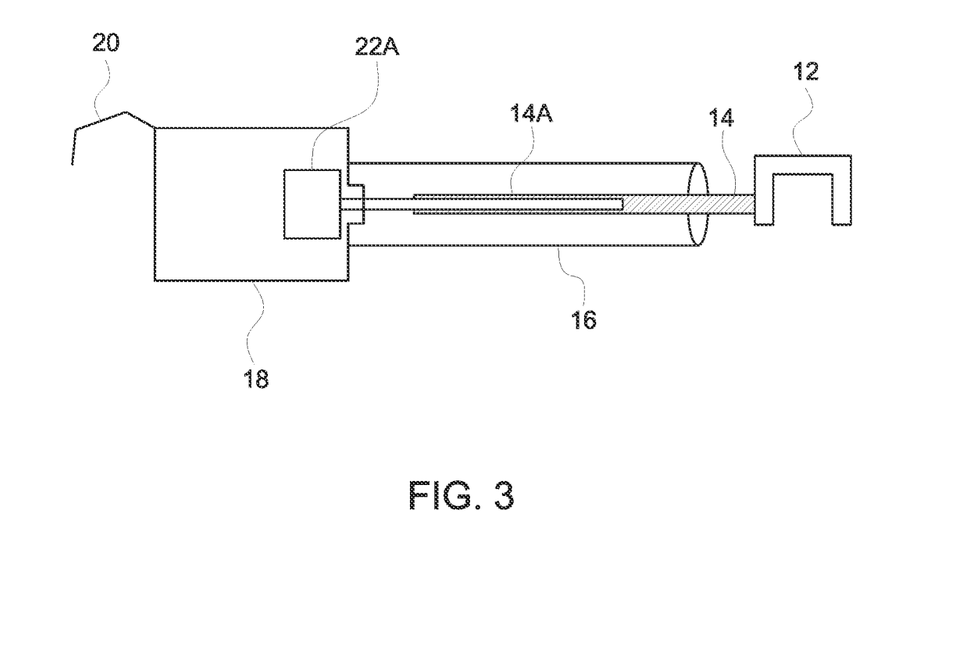
FIG. 3 illustrates a partially cut-away side view of a diagnostic and maintenance tool having an internal linear transducer, according to an exemplary embodiment of the present invention.

A control box 18 may be provided at the second end of the cylinder 16 opposite the first end of the cylinder 16 from which the ram rod 14 extends. The control box 18 may contain various system control functions, as discussed in greater detail below.

A component coupling device 20 may be disposed extending from the control box 18. The component coupling device 20 may be configured to attach to a component being manipulated by the tool 10. Such a component may include a brake pedal 70 (see FIG. 1) of a vehicle. The component coupling device 20 can take various shapes and may include a clamping mechanism or a hinged connection, or the like. In some embodiments, the component coupling device 20 may telescopically extend from the control box 18 (or a separate telescoping member, now shown), to permit length adjustment of the tool 10. In other embodiments, a connection between the cylinder 16 and the control box 18 may include a length adjustment mechanism, such as a telescoping tube, that may be used to adjust the overall length of the tool 10.

While the figures show the ram rod 14 being disposed to move the coupling member 12, the components may be changed in order so that, for example, the ram rod 14 moves the component coupling device 20 or moves the combined component coupling device 20 and control box 18, or the like. Thus, the cylinder 16 may be fixed to the coupling device 12 and may cause extension in a direction opposite that shown in FIGS. 2 and 3, for example.

A linear transducer 22 may be disposed on an external part of the tool 10, such as on the cylinder 16 as shown in FIG. 2, or may be disposed within the control box 18, as shown in FIG. 3. In general, a linear transducer is a type of position sensor which is used to measure movement in a linear fashion. Linear transducers do this by converting the linear displacement into electrical signals proportional to the displacement making it usable by machines. A linear transducer is also called an LVDT (Linear Variable Differential Transformer) and can use primary and secondary windings and a circular core in the middle of the sensor. The primary windings can be triggered with an AC supply producing a magnetic field which creates a signal for the secondary windings. The object which requires position measurement is attached to the rod end which moves the core when displaced. The core's movement causes the primary and secondary coils to have a change in voltage which gives a different output and the position can therefore be determined and measured continuously.

In some embodiments, magnetic position sensors 14A can be positioned along at least a portion of the ram rod 14. The magnetic position sensors can respond to the presence or to the interruption of a magnetic field to measure, in this case, linear movement of the ram rod 14.

Other position measurement devices may be used to measure the position of the ram rod 14, or, more specifically, the amount of extension of the ram rod 14 from the cylinder 16. For example, an optical sensor may detect markings along the length of the ram rod 14 to determine its extension length, or a mechanical roller, or the like, may be disposed to contact the ram rod 14 to measure distance traveled by the ram rod 14.

The pressure used to extend the ram rod 14 to both depress a pedal, for example, and to overcome the force of the recoil spring, may be measured by various mechanisms. In some embodiments, a mechanical pressure measurement may be recorded (for example, by a pressure sensing pad disposed within the ram rod 14 or at the connection between the ram rod 14 and the coupling member 12). This mechanical pressure measurement may be determined by a force applied to the ram rod by a ram rod moving device, such as an electric motor, for example. In some embodiments, an air pressure within the air cylinder 16 may be measured and related to the force applied to the pedal. In some embodiments, the compressed air source may be turned off (via an air solenoid, for example, as discussed above) to allow the system to watch for changes in air pressure and, thus, changes in the force applied to pedal. Such changes in force applied to the pedal (and/or changes in the linear extension of the ram rod 14) may be used to diagnose issues with the vehicle or equipment. In some embodiments, the compressed air source may be regulated to provide a constant pressure to the air cylinder 16. By holding this constant pressure, a distance of ram rod extension can be measured. As the pressure is maintained over time, further extension of the ram rod may indicate, for example, a small leak in a brake line.

Figure 4:
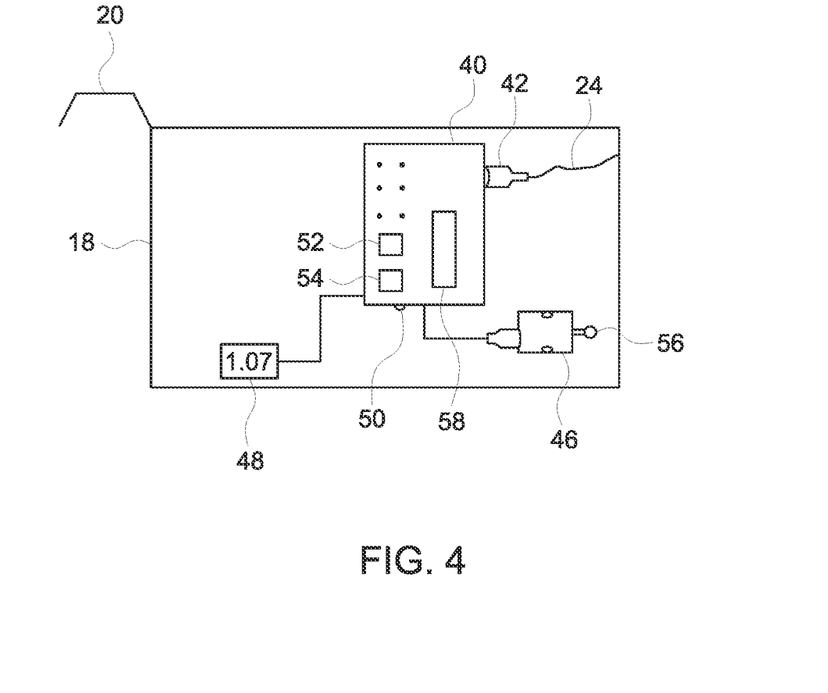
FIG. 4 illustrates a detailed view of components within the housing of the diagnostic and maintenance tool of FIG. 2.

Referring specifically to FIG. 4, the control box 18 can include a microcontroller 40 appropriate programmed (including, for example, a processor and memory 54) to provide the features of the tool 10 as discussed herein. The microcontroller 40 can receive an input 42 from the transducer 22/22A (see FIGS. 2 and 3). The microcontroller 40 can further communicate with an air pressure control device 46. The air pressure control device 46 can control the flow of compressed air from air port 56 to the cylinder 16. The air pressure control device 46 can send a signal to the microcontroller regarding the pressure of air currently in the cylinder 16. A switch 52 may be disposed on the control box 18 to turn the tool 10 on and off. Control buttons (not shown) may be provided on the tool 10, such as on the control box 18, to provide operation of the device. For example, one button may provide a predetermined force to extend the ram rod a distance out of the cylinder. The display of the control box 18 can record the distance travelled by the ram rod and/or the force applied. This predetermined force may be applied until another button is depressed to release the force. Other controls, such as a wired control panel (not shown) may be provided to permit remote access to controlling the tool 10. The control box and/or the wired control panel may have features similar to those described of the wireless controls discussed below.

A wireless transceiver 52 may be used to send data from the microcontroller 40 to a remove device, as discussed below. The wireless transceiver 52 may further be used to program the tool 10. For example, a user may be able to program the tool 10 to perform a particular routine, such as apply the brakes at 1 inch per second up to a predetermined pressure, remove the pressure on the brakes, re-apply the brakes after a certain period of time, and the like. In some embodiments, the wireless transceiver 52 can communicate with an external storage device (not shown) or the remote device (described below) to load a pre-made program. Such pre-made programs may be set up for brake bleeding, clutch diagnostics or the like. An internal battery 58, as described above, may be provided within the control box 18 for powering the microcontroller 40.

A display 48 may be provided to show the user the linear displacement and/or applied pressure. The display 48 may also show battery status, device status, a loaded program code, or the like.

Figure 5:
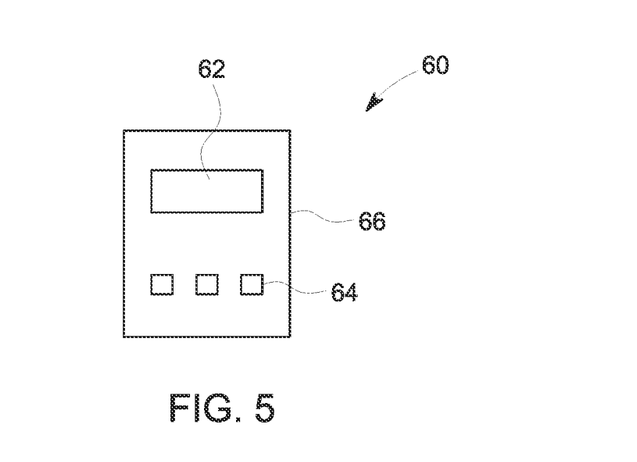
FIG. 5 illustrates a remote device for controlling the diagnostic and maintenance tool, according to an exemplary embodiment of the present invention.

Referring to FIG. 5, a remote device 60 may be a standalone device 66, as shown, or may be part of a remote computing device, such as a tablet, smartphone or the like. The remote device 60 may include a display 62, similar to the display 48 discussed above. The remote device 60 can include one or more keys 64 to control various aspects of the remote device 60 and/or the tool 10. For example, the keys 64 may include a power key, a pressure adjustment key, a program run key, a display select key (to choose what is shown in the display), or the like.

Figure 6:
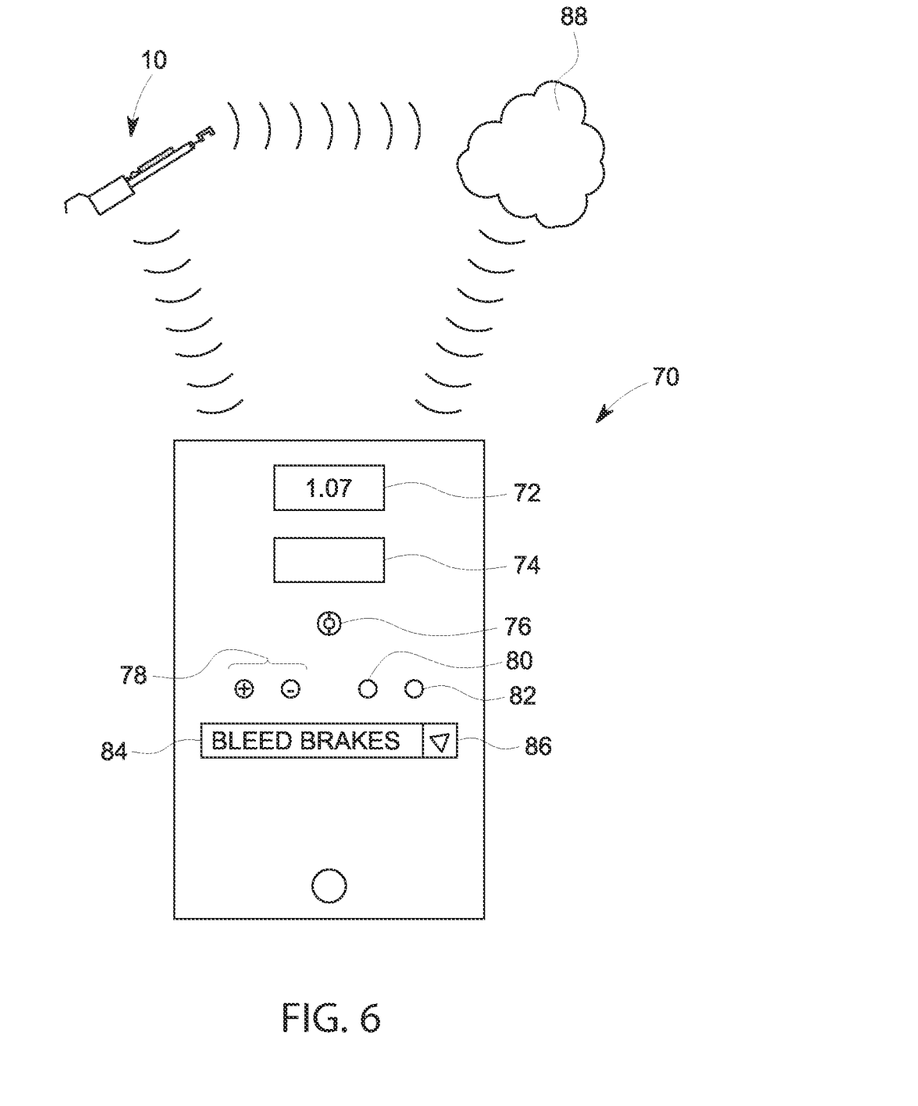
FIG. 6 illustrates a schematic communication diagram between the diagnostic and maintenance too of FIG. 2, a smart device, and cloud storage, according to an exemplary embodiment of the present invention.

Referring to FIG. 6, a smart device, such as a smart phone 70 can be programmed to receive data from the tool 10 in a wireless manner as is known in the art. For example, the tool 10 may communicate via Bluetooth®, Wi-Fi® or the like. Data from the tool 10 may be received by the smart phone 70 and displayed on one or more displays 72, 74 configured on the screen. Various virtual buttons may also be provided, such as a power button 76, air pressure regulation buttons 78, along with other buttons 80, 82 that may provide certain functions based on a selected program. The smart phone 70 may further display a drop down menu 84, where a user can press a selection button 86 to display a plurality of pre-programmed tests. For example, as illustrated, a brake bleed program may be selected, where the smart phone 70 can send signals to the tool 10 to perform such a function. The software on the smart phone 70 may further provide options for the user to program their own diagnostics routines and save them as custom programs. While a smart phone 70 is shown, other computing devices may be appropriate programmed to send and receive date with the tool 10, such as a tablet, a laptop computer, or the like.

In some embodiments, data may be stored on the smart phone 70 or in a cloud storage 88. For example, a customer may be provided a link to retrieve their own data that shows the test performed, test results, or the like. The data in the cloud storage 88 may interact with other tools, such as an auto service station's customer portal, where data on a customer's auto services may be stored, along with the appropriate test results from the tool 10.

The use of the tool 10 is described in the below specific example. Of course, aspects of the present invention should not be limited to any of the specific details provided herein. The wireless or wired display and control device can send a signal to the microcontroller 40 to actuate the cylinder. As the ram rod 14 extends, retracts or sits is a rested position, the magnetic position sensor 14A can send a signal to be read by the linear transducer 22, 22A, which can measure the linear displacement and positioning of the ram rod 14. This reading can be obtained by electronic pulses triggered by the magnetic position sensor 14A which is then sent wirelessly or via wire to the programmable logic controller/microcontroller 40. Typically, the data is measured in voltage readings which is then converted into linear positions or pressures based on the software programming installed on the programmable logic controller/microcontroller 40. This data can then be displayed via the programmable logic controller/microcontroller display or transferred wirelessly or by wire to be displayed on another device. This data can then be interpreted by a mechanic to assist in various diagnostics or maintenance activities. If more or less pressure is required to gather the proper readings, the pressure regulator can be adjusted by the display and control device.

Many diagnostic and maintenance results can be accomplished by engaging the pedals of equipment. Further information is obtained by measuring the distance traveled, measuring the pressure applied and controlling the pressure applied. For example, one technician can be able to remotely diagnose a failed master cylinder based on being able to measure pedal distance traveled. Further, one technician can remotely determine if the pedal is "getting firmer" after each brake line is bled by being able to measure pedal distance traveled in between each line being bled. Further, one technician can remotely and precisely control the pressure being applied to a clutch when bleeding it due to some clutches requiring the process to start at a lower pressure and increase throughout. Further, one technician can remotely "give it some gas" or engage the acceleration pedal when a vehicle is in park and they need to monitor how the machine is responding for other maintenance/diagnostic monitoring. Further, aspects of the present invention can make customers more confident in the work being performed, make customers more likely to accept/purchase certain recommendations because they can see quantifiable data, help auto shops reduce labor costs and wasted material cost by being more accurate and efficient, and help auto shops develop new profit centers with services recommended based on data.

Finally, aspects of the present invention can allow one technician to improve his or her accuracy, efficiency and effectiveness with quantifiable data. For example, a technician finishes a brake system job and takes the vehicle for test drive, where it feels good and there are no visible leaks. Such a feel and visualization, however, may miss the leak if it is microscopic and will expose itself over time. When the user's foot is applied on brake and the vehicle comes to a stop, human senses cannot detect a fraction of an inch difference in movement. While the brake feels "firm", the tool, according to aspects of the present invention, would detect that the applied pressure on the brakes stopped initially, but then moved a fraction of an inch, and, if it moved, that means something is not right. For example, such could indicate that there was a small hole in a brake line or maybe a caliper wasn't threaded correctly. By adding diagnostics provided by aspects of the present invention, a constant pressure could be applied to allow the leak to reveal itself. Sometimes a small leak requires constant pressure over a longer period of time than a technician inside doing a quick manual check with a few pumps of their foot could uncover.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A diagnostic and maintenance tool comprising:
   a ram rod housing, the ram rod housing is a cylinder;
   a ram rod, the ram rod operably coupled to the cylinder, wherein the ram rod is configured to extend from the cylinder and retract into the cylinder, wherein the cylinder is configured to extend the ram rod;
   a retracting ram rod component operably coupled to the cylinder, wherein the retracting ram rod component is configured to retract the extended ram rod;
   a pressure measuring device configured to measure a near real time pressure applied by the cylinder on the ram rod by measuring pressure within the cylinder;

a liner transducer configured to measure linear displacement of the ram rod in near real time; a first coupling member disposed on a distal end, relative to the ram rod housing, of the ram rod, the distal end defining a first end of the diagnostic and maintenance tool;

a second coupling member disposed on a second end of the diagnostic and maintenance tool, opposite the first end;

a controller, wherein the controller is configured to:
    couple to an external electronic device, wherein the external electronic device has a display,
    receive one or more instructions from the external electronic device, wherein the one or more instructions operate the diagnostic and maintenance tool,
    present the near real time pressure and the linear displacement on the display of the external electronic device,
    control a valve to pressurize the cylinder, wherein the valve is coupled to a pressurized supply component, thereby extending the ram rod or retracting the ram rod,
    execute a program, wherein the program is configured to change a pedal depression state to a first status of the pedal for a first pre-determined duration, and subsequently reapplication of said first status of the pedal after a second pre-determined duration, and
    receive an instruction for maintenance and/or diagnostic routines from the external electronic device; and a length adjustment mechanism configured to adjust a distance between the first coupling member and the second coupling member.

2. The diagnostic and maintenance tool of claim 1, wherein the linear transducer comprises a magnetic position sensor.

3. The diagnostic and maintenance tool of 1, further comprising a pressurized air coupling member operable to connect to an air line to provide a pressurized air to the cylinder.

4. The diagnostic and maintenance tool of claim 1, wherein the first coupling member is configured to attach to a fixed object.

5. The diagnostic and maintenance tool of claim 4, wherein the second coupling member is configured to attach to a component of a device being tested or maintained.

6. The diagnostic and maintenance tool of claim 1, wherein the linear transducer comprises an optical sensor, the ram rod has markings along its length, the optical sensor is configured to detect the marking for determining the linear displacement.

* * * * *